(12) United States Patent
Hildebrand et al.

(10) Patent No.: US 6,770,825 B1
(45) Date of Patent: Aug. 3, 2004

(54) REINFORCED CONNECTION BETWEEN A DISTRIBUTOR AND A DISTRIBUTOR CAP

(75) Inventors: George Hildebrand, Uncasville, CT (US); Jack McLeod, North Haven, CT (US)

(73) Assignee: Standard Motor Products, Inc., Long Island, NY (US)

( * ) Notice: Subject to any disclaimer, the term of this patent is extended or adjusted under 35 U.S.C. 154(b) by 0 days.

(21) Appl. No.: 10/413,517

(22) Filed: Apr. 15, 2003

(51) Int. Cl.[7] .................. H01H 19/00; H05K 5/00; B25B 5/00
(52) U.S. Cl. ................... 200/19.32; 123/146.5 R; 123/647; 269/249; 200/19.33; 200/19.39; 200/293
(58) Field of Search .................... 200/19.01–19.4, 200/293–307; 123/146.5 R, 146.5 A, 633, 647; 269/249; 403/364–375; 29/622

(56) References Cited

U.S. PATENT DOCUMENTS

| | | | |
|---|---|---|---|
| 2,605,368 A | * | 7/1952 | Scott ...................... 200/19.03 |
| 3,725,620 A | * | 4/1973 | Schneider et al. ........ 200/19.39 |
| 4,224,917 A | * | 9/1980 | Nakazawa et al. ................. 123/146.5 A X |
| 4,270,259 A | | 6/1981 | Tichy et al. ................. 123/635 |
| 4,526,157 A | | 7/1985 | Theofanous ............. 200/19.39 |
| 5,131,780 A | * | 7/1992 | Love ...................... 403/373 X |
| 5,139,003 A | | 8/1992 | Ohhashi et al. ........... 29/402.06 |
| 6,407,352 B1 | | 6/2002 | Aluise ........................ 123/595 |

* cited by examiner

Primary Examiner—James R. Scott
(74) Attorney, Agent, or Firm—Liniak, Berenato & White

(57) ABSTRACT

The present invention is a reinforced connection between a distributor body and a distributor cap. The distributor cap rests on the distributor body as in the conventional arrangements. However, an additional clamp is provided to mount over the interface between the distributor cap and distributor sandwiching the components there between. A screw/bolt passes through the clamp and through both the cap and distributor body and engages a threaded portion of the clamp. By simply tightening the screw/bolt, the cap and distributor are clamped together without inducing concentrated stresses in the distributor body. The clamp may be used in a retrofit application to strengthen the existing connection between the cap and distributor body, repair the connection in a cracked or otherwise damaged distributor, or installed as part of an original equipment design.

10 Claims, 5 Drawing Sheets

REINFORCED CONNECTION BETWEEN A DISTRIBUTOR AND A DISTRIBUTOR CAP

BACKGROUND OF THE INVENTION

1. Field of the Invention

The present invention is directed a reinforced structural connection between a distributor and a distributor caps for internal combustion engines.

2. Discussion of Related Art

Distributor assemblies and the connection to a distributor cap are well known in the art. Generally the distributor cap sits on top of the distributor. A lip of the distributor cap extends about a peripheral rim of the distributor and is clamped down to form a sealed connected there between. Conventionally either a pair of spring arms extends from the distributor to engage a seat formed in the cap to retain the cap mounted on the distributor. On other arrangements, a screw or bolt simply passes through the distributor cap and threading engaged a portion of the distributor body to for the connection. These connections were adequate on the past. However, recently some automotive manufactures have constructed the distributor body out of plastic material in an effort o reduce costs, weight etc. However, this arrangement has caused a problem for the latter described arrangement where a screw threadingly engages the body of the distributor. In such arrangements, the installation of the screw is torque sensitive. When installing the distributor cap, the connection is very sensitive to the torque applied to the screw. If too mach torque is applied, the plastic body adjacent the screw may crack or otherwise weaken and the distributor cap is no longer adequately connected to the distributor body. This can lead to further breakage, breach the integrity of the sealed connection and require replacement of the distributor body which is costly and time consuming.

SUMMARY OF THE INVENTION

The present invention is directed to a reinforced connection between a distributor body and a distributor cap. The distributor cap rests on the distributor body as in the conventional arrangements. However, an additional clamp is provided to mount over the interface between the distributor cap and distributor sandwiching those components between the clamp. A screw/bolt passes through the clamp and through both the cap and distributor body and engages a threaded portion of the clamp. By simply tightening the screw/bolt, the cap and distributor are clamped together without inducing concentrated stresses in the distributor body. The clamp may be used in a retrofit application to strengthen the existing connection between the cap and distributor body, repair the connection in a cracked or otherwise damaged distributor, or installed as part of an original equipment design.

BRIEF DESCRIPTIONS OF THE DRAWINGS

DETAILED DESCRIPTION OF THE PREFERRED EMBODIMENT

Figure 6:
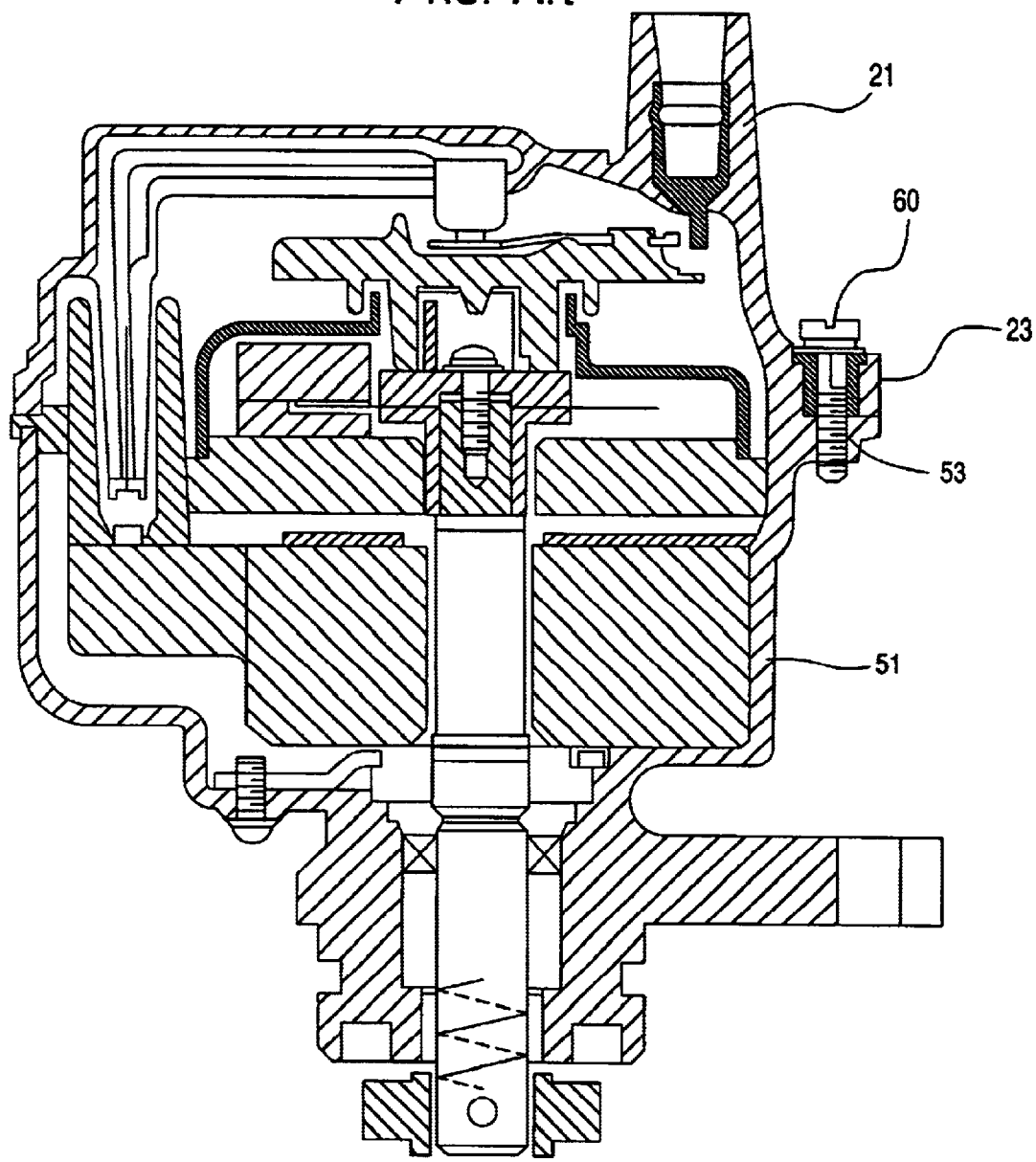
FIG. 6 is a sectional view of a conventional distributor and cap assembly.
Figure 7:
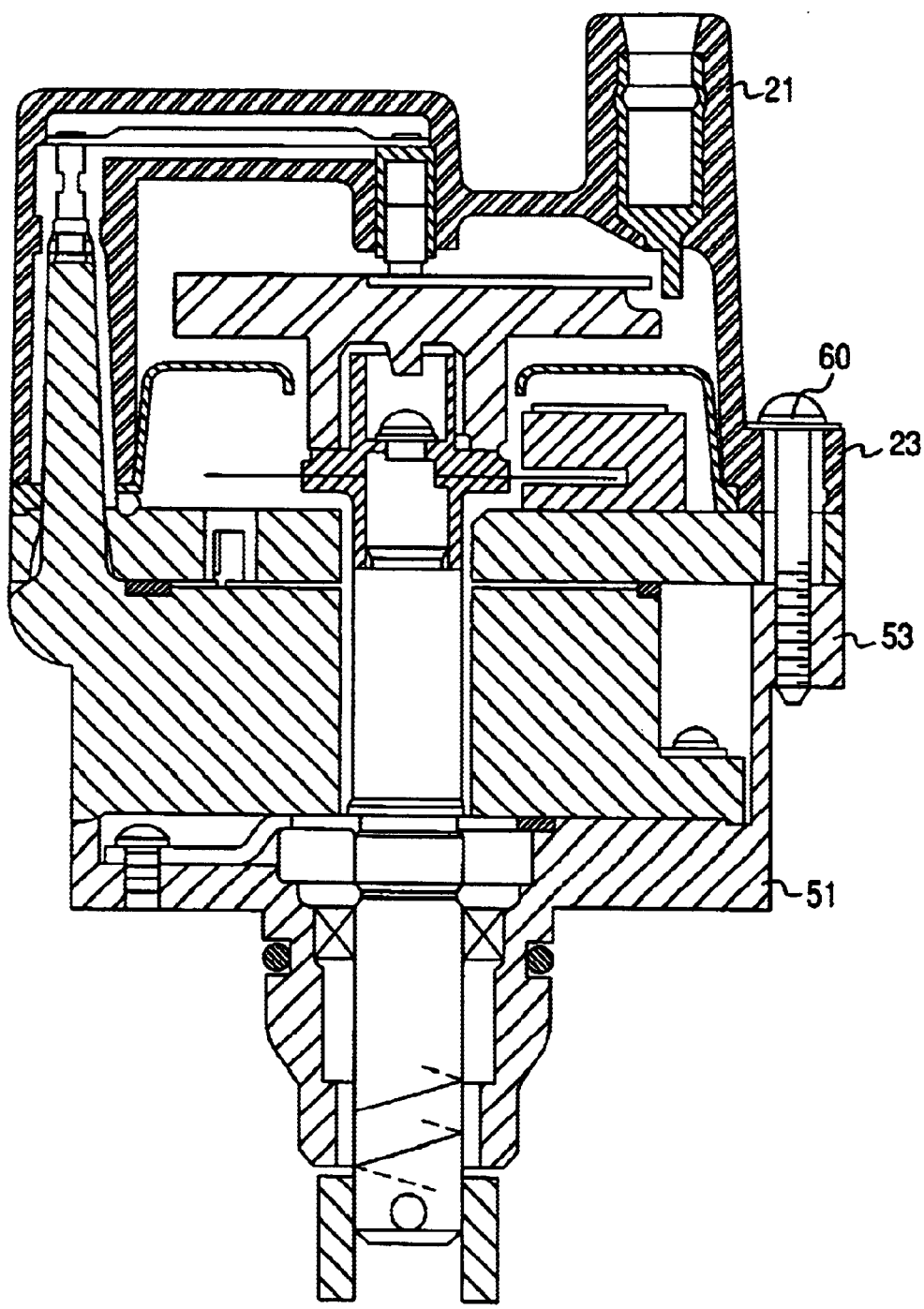
FIG. 7 is a sectional view of another conventional distributor and cap assembly.

FIGS. 6 and 7 each represent a conventional ignition distributor assembly for an internal combustion engines. A distributor cap 21 is mounted to a distributor housing 51 via commentary mounting flanges 23, 53. Corresponding aligned mounting bores are formed in each of the flanges 23, 53 which received a threaded fastener 60 which simply threadingly engages the mounting bore of the distributor housing to secure the distributor cap 21 and distributor housing together. However, such arrangements are prone to breakage. Particularly the mounting flange 53 of the distributor housing 51 can crack, or otherwise break when the threaded fastener is over torqued. Often the distributor housing 51 is made of weaker material such as plastic or other materials of inadequate size to endure the needed compressive force to be applied between the housing 51 and cap 21.

Figure 1:
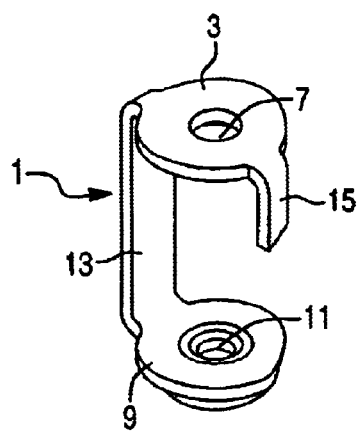
FIG. 1 is an isolated perspective view of a clamp used to reinforce the connection according to the present invention.
Figure 2:
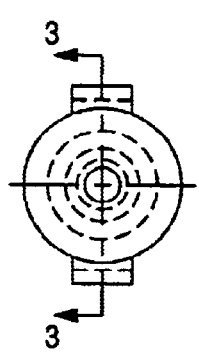
FIG. 2 is a top view of the clamp of FIG. 1.
Figure 3:
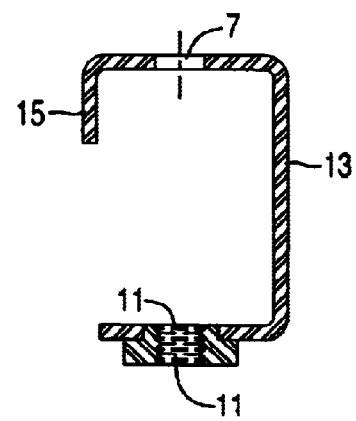
FIG. 3 is a sectional view taken along line 3—3 of FIG. 2.
Figure 4:
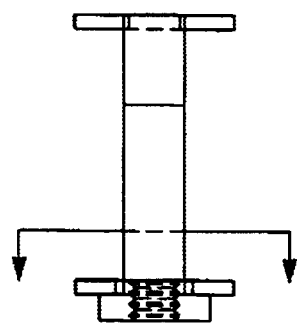
FIG. 4 is a side view of the clamp of FIG. 1.
Figure 5:
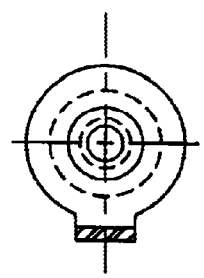
FIG. 5 is a sectional view taken along line 5—5 of FIG. 4.

The present invention utilizes a clamp to structurally reinforce the connection between such distributor housings and associated distributor caps. FIG. 1 depicts a perspective view of a C-shaped clamp member 1 according to a preferred embodiment of the present invention. The clamp 1 has a top portion 3 with a top mounting hole 7 and a bottom portion 9 having a threaded mounting hole 11. The threaded mounting hole 11 of the C-shaped clamp member 1 may include a nylon coating 11a to prevent the threaded fastener from undesired loosening. An intermediate member 13 bridges the top and bottom portions. The top portion 3 further includes a downwardly extending portion 15. FIGS. 2–5 are additional views of the clamp 1 of FIG. 1.

Figure 8:
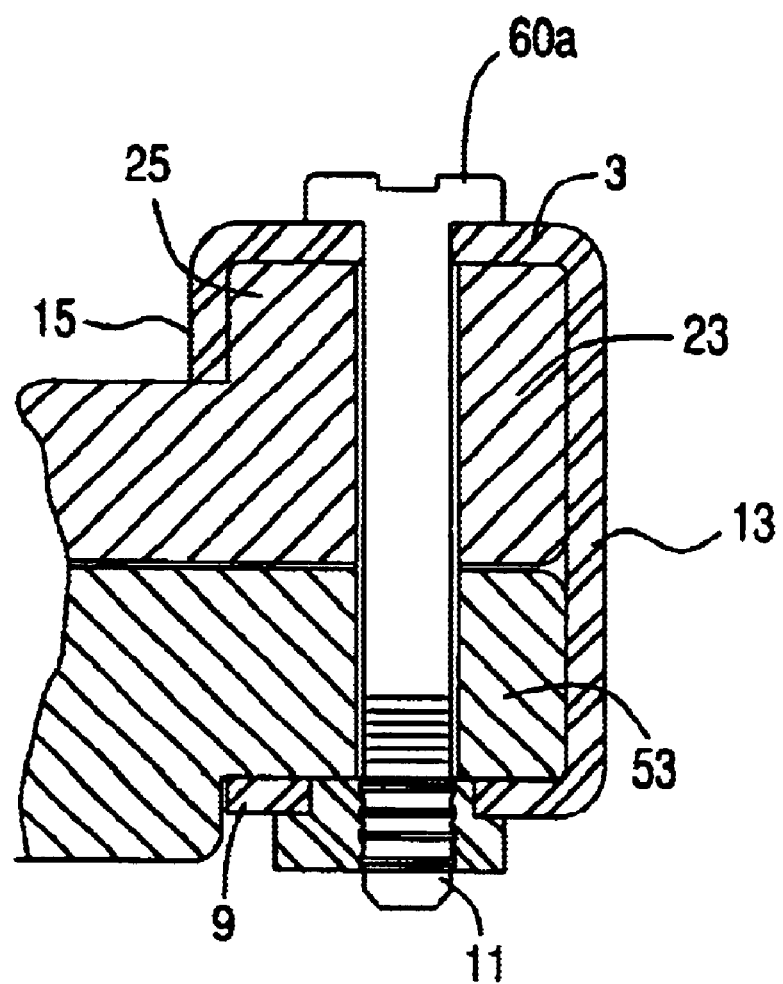
FIG. 8 is an isolated view of the clamp of FIG. 1 mounted to a distributor and cap assembly.

FIG. 8 depicts the clamp 1 disposed about the mounting flanges 23, 534 of the distributor housing 51 and distributor cap 23. The length of the intermediate member 13 is preferably dimensioned such that the top portion 3 directly engages the mounting flange 23 of the cap 21 and the bottom portion 9 directly engages the bottom portion of the mounting flange 53 of the housing 51. A threaded fastener 60a is disposed through the top portion of the clamp 1 through the housing and cap and threadingly engages the bottom portion of the clamp 11. The threaded fastener 60a may be tightened firmly to secure the housing 51 and cap 21 together. The clamp member disburses the compressive force applied to the housing over a wider area which prevents the housing from breaking. Furthermore, the clamp is preferably made of metal which is sufficiently strong enough that even if the housing 51 were cracked, the connection remains intact.

Figure 9:
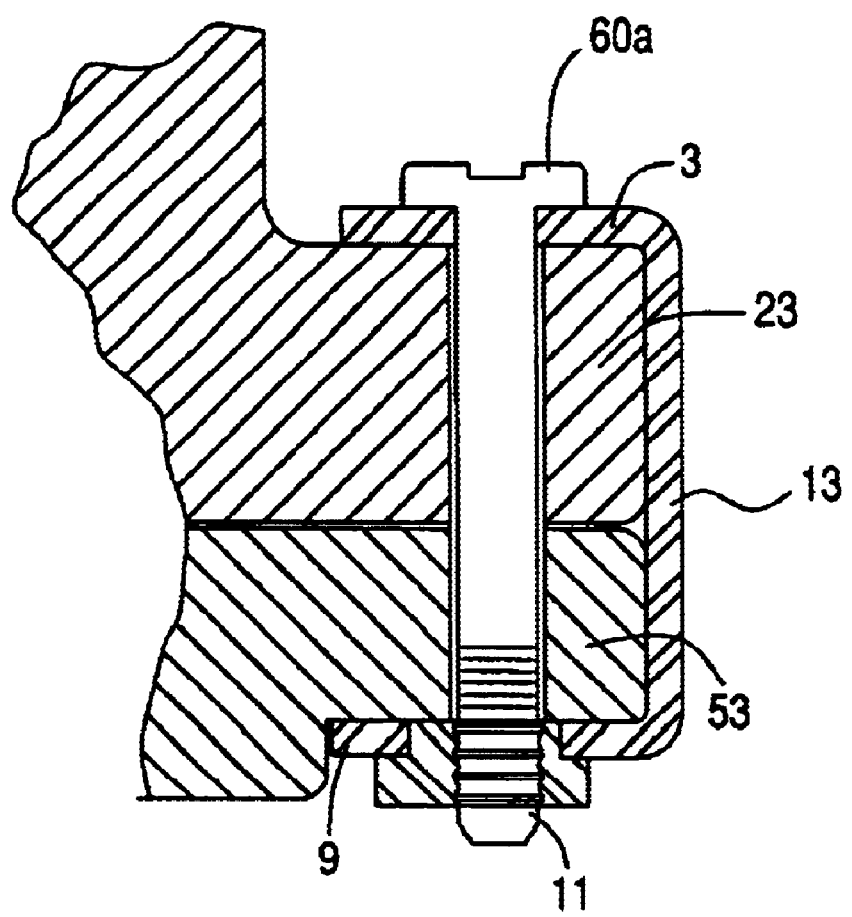
FIG. 9 is an isolated view of the clamp according to an alternate embodiment of the present invention.

The clamp arrangement shown in FIG. 8 depicts a downwardly extending portion 15 provided to engage an inner radial surface 25 of the flange 23 of the cap 21. This extension 15 helps to retain the clamp 1 in a proper position and otherwise enhance the structural integrity of the overall connection between the housing 51 and cap 21. It is noted that while the extension portion 15 serves an important function, it is not essential in establishing a reinforced connection between the housing 51 and cap 21. For example, in the conventional arrangements depicted in FIGS. 6 and 7 such an extension is not employed. FIG. 9 represents an alternate embodiment of the present invention without implementing the downward extension 15. The method of installing the clamp member 1 will now be explained.

Installation of the clamp member 1 to an existing distributor assembly is rather straightforward. The threaded fastener 60 is removed from the assembly, the cap 21 remains installed or is reinstalled installed and aligned. The clamp member 1 is simply slid over the mounting flanges 23, 53 and the corresponding cores aligned. The fastener member 60a (or existing member 60) is inserted through the clamp 1, and flanges 23, 53 and further to threading engage the bottom threaded portion 11 of the clamp 1. The threaded fastener 60a (60) is the properly tightened to positively secure the fastener to the clamp and positively retain the flanges 23, 53 of the housing 51 and cap 21 within the clamp. The installation may be retrofitted to existing distributor assemblies, employed to repair a cracked distributor in an existing assembly, or employed as part of an original equipment design. The reinforced connection of the present invention is particularly beneficial to strengthen the connection in distributor assemblies employing plastic distributor housings 51. The clamp member is preferably made of a stamped metal.

While the foregoing invention has been shown and described with reference to a preferred embodiment, it will be understood by those possessing skill in the art that various changes and modifications may be made without departing from the spirit and scope of the invention.

What is claimed is:

1. A reinforced connection between an internal combustion engine ignition distributor housing and a distributor cap secured to said housing through at least one threaded fastener, both said cap and said housing having complementary mounting flanges each including at least one mounting bore aligned with each other, said cap being secured to said housing by said threaded fastener extending through said mounting bores thereof, a clamp including at least one substantially C-shaped member outwardly engaging said mounting flanges of said housing and said cap, said clamp having oppositely spaced mounting holes aligned with said mounting bores and receiving said threaded fastener there through.

2. The reinforced connection according to claim 1, wherein said substantially C-shaped clamp has a top portion engaging said distributor cap and a bottom portion engaging said housing, said bottom portion having a threaded bore aligned with said mounting bore of said housing, said threaded fastener threadingly engaging said threaded bore of said bottom portion.

3. The reinforced connection according to claim 2, wherein said threaded bore of said C-shaped member includes a nylon coating to prevent said threaded fastener from undesired loosening.

4. The reinforced connection according to claim 1, wherein said substantially C-shaped member has a top portion engaging said distributor cap and a bottom portion engaging said housing, said top portion including a projection extending downward an engaging a radial inner surface of said mounting flange of said cap.

5. The reinforced connection according to claim 1, wherein said housing is made of plastic and said clamp is made of metal.

6. The reinforced connection according to claim 4, wherein said housing is made of plastic and said clamp is made of metal.

7. A structural connection between an internal combustion engine ignition distributor housing and a distributor cap, both said cap and said housing having complementary mounting flanges in mutual engagement, said connection comprising a substantially C-shaped clamp member engaging each said mounting flanges of said housing and said cap, and a threaded fastener extending through said clamp member and said mounting flanges and threadingly engaging a threaded bore of a portion of said clamp member whereby when said threaded fastener is tightened said mounting flanges are secured to one another in said mutual engagement and disposed between a top and a bottom portion of said clamp member.

8. The structural connection according to claim 7, wherein said substantially C-shaped clamp member has a top portion engaging said distributor cap and a bottom portion engaging said distributor housing, said top portion including a projection extending downward an engaging a radial inner surface of said mounting flange of said distributor cap.

9. The structural connection according to claim 8, wherein said housing is made of plastic and said clamp member is made of metal.

10. A method if installing a reinforcing clamp member to a connection between an ignition distributor housing and a distributor cap each having complementary mounting flanges, said method comprising the following steps, installing said distributor cap on said distributor housing and aligning said complementary mounting flanges with one another;

installing said reinforcing clamp member about said complementary mounting flanges;

inserting a fastener through corresponding bores of each of said reinforcing clamp and said mounting flanges;

positively securing said fastener to said clamp to thereby positively retain said mounting flanges of said housing and said cap within said clamp.

* * * * *